United States Patent [19]

Klumpp

[11] 3,895,277

[45] July 15, 1975

[54] ELECTRONIC DYNAMIC BRAKING FOR TAPE RECORDER DEVICES

[75] Inventor: Marlin K. Klumpp, Ann Arbor, Mich.

[73] Assignee: Sycor, Inc., Ann Arbor, Mich.

[22] Filed: May 24, 1973

[21] Appl. No.: 363,476

[52] U.S. Cl. ................ 318/269; 318/327; 318/369; 318/373; 318/463

[51] Int. Cl. .............................................. H02p 3/20

[58] Field of Search ........... 318/373, 374, 369, 269, 318/379, 463, 464, 327

[56] References Cited

UNITED STATES PATENTS

| | | | |
|---|---|---|---|
| 3,350,616 | 10/1967 | Greening | 318/327 |
| 3,500,163 | 3/1970 | Moritz | 318/373 |
| 3,521,139 | 7/1970 | Kendall | 318/373 |
| 3,725,758 | 4/1973 | Loyk | 318/269 |
| 3,748,552 | 7/1973 | Arthur | 318/373 |

*Primary Examiner*—B. Dobeck
*Attorney, Agent, or Firm*—Price, Heneveld, Huizenga & Cooper

[57] ABSTRACT

For use in a tape transport including a drive motor for transporting tape across a recording or playback head, and a motor drive circuit for selectively applying drive current to the motor, an electrical circuit for applying a reverse drive current to the motor for rapidly reducing the speed of the drive motor upon the receipt of a stop signal. The circuit provides controlled reverse current to the drive motor over a period of time initiated by a stop signal and extending until a predetermined reduced speed is reached after which the reverse drive signal is removed and the motor allowed to coast to a halt.

14 Claims, 2 Drawing Figures

ELECTRONIC DYNAMIC BRAKING FOR TAPE RECORDER DEVICES

BACKGROUND OF THE INVENTION

The present invention relates to tape transport apparatus and specifically to a method and apparatus for reducing the time required to stop the transport from a running speed.

In tape transports employed with data processing equipment and specifically, cassette transports, the design criteria for stopping the transport from a playback or recording mode of operation sets the limit that the tape can travel after a stop signal is received to approximately 0.1–0.2 inches. This relatively critical stopping distance is required in order to produce interrecord gaps between recorded segments sufficiently short to conform to recently promulgated recording formats as well as to efficiently utilize the entire length of the tape for recording several records thereon.

In cassette tape transports, direct current permanent magnet motors are typically employed to drive a tape capstan which in turn transports tape in a cassette across the recording and playback heads. In many existing transports, the tape is stopped by simply removing the drive current for the motor. In such systems, however, the inertia of the drive mechanism allows the tape to coast a distance far in excess of the acceptable limits.

To reduce the stopping time of tape transports, several approaches have been utilized including the shorting of the armature leads during the stopping interval. This induces a current in the armature which develops a magnetic field that opposes further rotation of the armature thereby slowing the motor and the drive mechanism of the transport. It has been found that although such an approach reduces the braking time over that available by simply removing the motor drive current, the braking time and, therefore, distance in cassette recorders remains excessive.

A second approach has been to utilize a frictional brake apparatus which contacts a moving portion of the drive mechanism. Frictional brake systems, however, add considerably to the expense and bulk of a transport and additionally require frequent adjustment as the frictional braking element wears during use. This adjustment is required to maintain the stopping distance relatively constant and frequently such adjustments are rather time consuming and relatively difficult to accurately achieve.

Thus, there exists a need for an improved braking system for use with data processing tape transports and particularly, cassette recorders which will overcome the shortcomings of the known braking techniques employed to reduce the braking time.

SUMMARY OF THE INVENTION

The system of the present invention solves the need for the relatively fast braking time required in cassette tape transports while not requiring expensive or bulky mechanical braking means by providing an electrical control circuit which, upon the receipt of a stop signal, applies a reverse current to the drive motor of the transport for a period of time sufficient to slow the transport from a running speed to a lower speed limit after which the transport is allowed to coast to a halt.

Tape transport systems embodying the present invention include means for providing signals indicating the speed of a moving element of a tape transport mechanism which includes a drive motor. Selectively actuated circuit means are coupled to the providing means for developing a reversing drive signal applied to the motor in response to the receipt of a stop control signal and applying the reversing signal to the motor until the tape speed reduces to a predetermined value as indicated by the signals from the providing means.

It is an object of the present invention to provide an improved braking system for tape transports.

Another object of the present invention is to provide an electrical circuit for developing a reverse drive signal which is applied to the drive motor of a tape transport for rapidly slowing the transport speed from a running speed to a predetermined lower speed.

A further object of the present invention is to provide a method of reducing the stopping time of a tape in a tape transport system.

These and other objects of the present invention will become apparent upon reading the following description thereof together with the accompanying drawings in which:

DETAILED DESCRIPTION OF THE PREFERRED EMBODIMENT

Figures 1, 2:
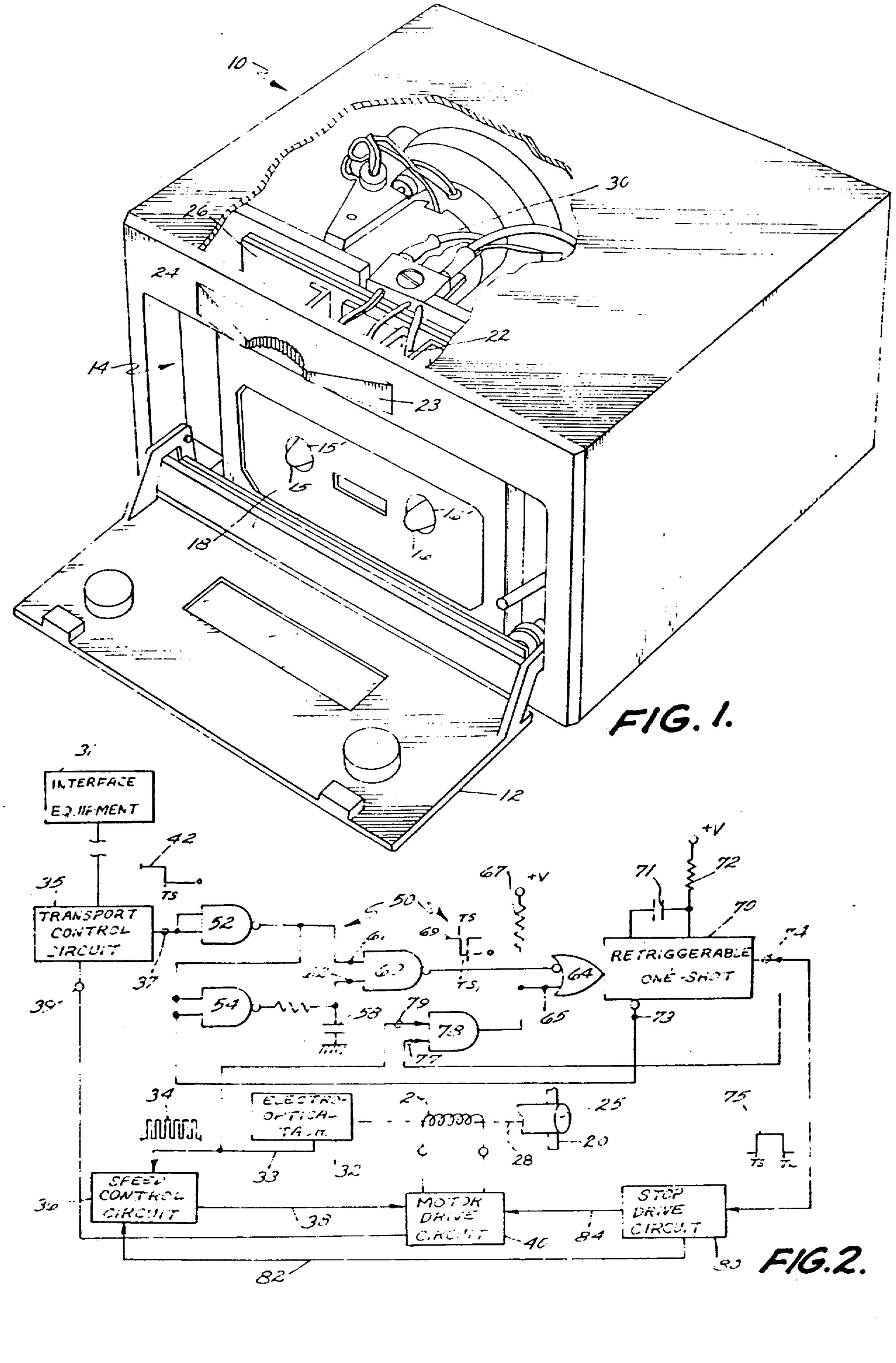
FIG. 1 is a perspective view of a cassette tape transport embodying the present invention shown with the case partly broken away.
FIG. 2 is an electrical circuit and mechanical diagram partially in block and schematic form showing the electrical circuit employed in the preferred embodiment of the invention.

In FIG. 1 there is shown a cassette data processing recorder 10 including a hinged front door 12 providing access to a cassette receiving recess 14. The recorder includes a pair of spaced spindles 15 and 16 adapted to extend through correspondingly spaced tape reel apertures 15' and 16' of a Phillips type cassette 18 when the cassette is inserted into the recorder. Tape 20 (FIG. 2), wound on the reels of the cassette, is driven adjacent write and read-after-write heads 22 and 24, respectively, of the recorder which are positioned on a carriage assembly 26 as seen in FIG. 1.

A drive capstan 25, shown schematically in FIG. 2, is coupled to the shaft 28 of a drive motor 30 shown in FIG. 1. Shaft 28 is also coupled to an electro-optical tachometer 32 (FIG. 2). Tach 32 is similar to a tach described in greater detail in a copending application entitled DATA-ENTRY CLOCK MEANS AND METHOD OF IMPLEMENTING SAME, Ser. No. 189,376, filed Oct. 14, 1971 and assigned to the present assignee. Motor 30 is a conventional permanent magnet, direct current motor including an armature winding 29 which is electrically coupled to a motor drive circuit 40 for receiving drive signals as described in greater detail below.

The tape drive mechanism includes a pinch roller (not shown) opposite drive capstan 25 such that the tape is engaged therebetween and transported across the heads 22 and 24. In addition, a pair of torque motors (not shown) are coupled to the drive spindles 15 and 16 to maintain tension on a tape during its motion across the heads and between the tape reels of the cartridge. A thumb slide 23 is mechanically coupled to the pinch roller to control its positioning with respect to the capstan and also engages an electrical switch for controlling actuators to move carriage 26 and shift the heads 22 and 24 into operative engagement with the tape during playback and record modes of operation. The thumb slide additionally serves the purpose of locking the cover door in a closed position.

In addition to the mechanical drive assembly, the record 10 includes a transport control circuit 35 which can be of conventional design and includes switching circuitry which responds to signals received from external sources so as to selectively conduct recording and playback data signals to and from heads 22, 24 as well as apply control signals for actuating the motor drive circuit.

The electro-optical tachometer 32 provides a pulse train as shown by the waveform 34 accompanying output conductor 33 of the tach. Pulses 34 are representative of the tape speed and are applied to a speed control circuit 36 as well as to the motor stop circuit 50. Tach 32 and circuits 36 and 40 provide a closed loop feedback system for maintaining the tape speed at desired and constant recording and playback speeds. The speed control circuit 36 can be of conventional design to respond to pulses received from the tach to apply a speed regulating signal to the motor drive circuit 40 via conductor 38 which maintains the record and playback speeds constant during these modes of operation.

Motor drive circuit 40 is of the type which generates drive pulses having a duty cycle selected for the desired tape speed. Thus for example, if the tape speed is desired to be increased, the duty cycle or the percentage "on time" of current applied to the armature winding 29 increased. Circuit 35 provides control signals (e.g., polarity-coded) for driving motor 30 in a forward direction during record and playback and a reverse direction during rewind and the dynamic braking employed. Such control signals are provided at output terminal 39 of circuit 35 which is coupled to circuit 40.

The transport control circuit 35 is suitably coupled to remote interface equipment 31 for receiving tape command signals including a stop command signal to which it responds to generate a stop signal shown by waveform 42 adjacent the output conductor 37 of the circuit. As seen by waveform 42, the signal will be at a logic high level corresponding to a running mode of operation for the motor and drops to a logic 0 level upon the receipt of a stop command signal. This transition occurs at an instant of time, indicated as $t_s$ in FIG. 2, and after which drive motor 30 is desired to be stopped to prevent tape movement in excess of the 0.1–0.2 inches as discussed above. In order to provide a reduced stopping time, the conventional motor drive and speed control circuitry is supplemented by the motor stop circuit 50 now described.

Circuit 50 is coupled to tach 32 by conductor 79 to receive tape speed representative signals and to circuit 35 by conductor 37 to receive the stop signal. The output of circuit 50 is coupled by lead 74 to a stop drive circuit 80 which applies a signal of controlled duration to circuit 40 via conductor 84 to actuate the motor drive circuit to supply a reverse drive signal to motor 30 to rapidly stop the motor.

Circuit 50 inclues NAND gate 52 having input terminals commonly coupled to output terminal 37 of circuit 35. The output of NAND gate 52 is coupled to the input terminals of NAND gate 54 and to input terminal 61 of NAND gate 60. The output terminal of NAND gate 54 is coupled to an integrator circuit comprising resistor 56 and capacitor 58, the juntion of which is coupled to a second input terminal 62 of gate 60.

The output terminal of gate 60 is coupled to the inverting input 63 of OR gate 64. The output terminal of OR gate 64 is coupled to the input of a retriggerable one-shot multivibrator 70 whose relaxation period is determined at least in part by the RC time constant of a resistor 72 coupled to a source of voltage +V and a capacitor 71. The retriggerable one-shot multivibrator can be a Fairchild type 9602 integrated circuit whereupon the resistor is coupled to terminal 2 while the opposite terminal of capacitor 71 is coupled to terminal 1. The retriggerable one-shot multivibrator 70 includes an input terminal 73 which receives a logic low signal thereat when signal 42 is at a logic high state. A logic low signal at terminal 73 prevents multivibrator 70 from triggering. Terminal 73 is coupled to the output terminal of NAND gate 52 to assure that multivibrator 70 is inhibited while the drive motor 30 is in a running mode of operation thereby preventing the accidental generation of a stop pulse during the operation of the tape transport.

The retriggerable one-shot multivibrator 70 further includes an output terminal 74 at which there is developed a controlled stop pulse 75 initiated at time $t_s$ and terminating at a later time indicated by $t_L$ in the figure.

Signal 75 is applied to one input terminal 77 of an AND gate 78 having its remaining input terminal 79 coupled to the tach circuit 32 for receiving pulses 34. Gate 78 is enabled by the positive going pulse 75 to apply the tach pulses 34 to input terminal 65 of OR gate 64. Terminal 65 is connected to the positive voltage supply +V by a resistor 67 for bias selecting purposes. Having briefly described the interconnection of the circuit elements employed with the system of the present invention, a description of the operation of the system is presented.

OPERATION

During the running mode of operation (i.e., during playback, recording or rewind), the signal at output terminal 37 of circuit 35 will be at a logic high state (i.e., 1). The output of gate 52 will, therefore, be at a logic low state (i.e., 0 ) which holds the output of gate 54 in a high state. The 1 from gate 54 is applied to terminal 62 of gate 60 while a 0 is also applied to terminal 61 of the gate from gate 52. Gate 60, therefore, will provide a logic 1 output indicated by waveform 69 adjacent the output terminal of the gate.

At this time, output terminal 74 of multivibrator 70 will be at a low state thereby inhibiting AND gate 78 from passing positive clock pulses 34 to terminal 65 of gate 64. With the input applied to inverting terminal 63 of gate 64 at a high state and the input applied to terminal 65 of the gate at a low state, the output of gate 64 remains in a low state preventing the triggering of the multivibrator 70 such that the output at terminal 74 remains at a logic low state.

When the interface equipment 31 generates a stop command signal, the output terminal 37 of transport circuit 35 drops to a logic low state (indicated at time $t_s$ ) which causes the output of gate 52 to switch from a low to a high logic state. The output of gate 54 drops to a logic low state. The integrator circuit formed by resistor 56 and capacitor 58 momentarily holds the terminal 62 of gate 60 in a logic high state thereby causing the output of gate 60 to switch to a low state at time $t_s$ as indicated by the stop pulse 69 adjacent gate 60.

With input terminal 63 of gate 64 at 0, the output switches to a 1 triggering multivibrator 70 to provide a logic 1 at terminal 74. After a predetermined time interval determined by the RC time constant of resistor 56 and capacitor 58, terminal 62 will drop to a low state causing the output of gate 60 to again go to a high state indicated at time $t_{s1}$ in waveform 69.

Once the retriggerable one-shot multivibrator is initially triggered by stop pulse $t_s$, its output will remain at 1 during the relaxation period determined by the RC time constant of resistor-capacitor 72, 71 respectively. The positive-going output signal at terminal 74 is initiated at approximately the time $t_s$, shown by the controlled stop pulse waveform 75. Signal 75 is applied to gate 78 via input terminal 77. With terminal 77 at a logic high state, gate 78 is enabled to apply the positive going tach pulses 34 to input terminal 65 of gate 64. With terminal 63 returned to a high state, the output of gate 64 will be a 1 during the positive interval of each of the reoccurring tach pulses 34 applied to terminal 65.

The frequency of the tach pulses is directly related to the tape speed and when the controlled stop pulse 75 is initiated (and the transport, therefore, is still at a running speed), pulses 34 will be of a frequency sufficiently high to retrigger multivibrator 70 since the time duration between successive tach pulses will be shorter than the relaxation period fixed by the resistor 72 and capacitor 71. The leading edge of the controlled stop pulse 75, when applied to stop drive circuit 80, causes the motor drive circuit 40 to apply a reverse drive current to the armature winding 29.

It is noted here that circuit 80 is coupled to the speed control circuit 36 via conductor 82 to actuate, via conductor 38, the motor drive circuit 40 to remove the existing drive signal. Circuit 40 receives a polarity command signal from output terminal 39 of circuit 35 at time $t_s$ such that when the controlled stop pulse 75 is applied, circuit 40 will supply a reverse polarity current pulse to the armature winding 29. This reverse current pulse rapidly slows the drive motor and, therefore, tape 20.

As the motor speed reduces, the frequency of tach pulses 34 will decrease until the time period between successive tach pulses exceeds the relaxation period of the retriggerable multivibrator at which time the desired and presettable (by selecting the RC time constant of 72, 71) lower speed limit has been reached and the output 74 of the multivibrator will again return to a logic low state at time $t_L$ as indicated by the waveform diagram 75. At this time, the tape speed and motor speed have been sufficiently reduced such that upon the removal of all drive current from armature winding 29 by circuits 40 and 80 in response to the trailing edge of pulse 75, the motor will come to a substantially immediate halt without reversing direction.

Once the retriggerable one-shot multivibrator has returned to its steady state condition with a logic low output, terminal 74 again goes to a logic low state inhibiting gate 78 which in turn prevents tach pulses 34 from triggering multivibrator 70 until a successive stop signal is received. Gates 54 and 60 together with the RC network (56, 58) form a pulse shaping circuit which allows the initial stop pulse 69 to be of relatively short duration thereby permitting the tach pulse frequency to control the removal of the reverse drive pulse at time $t_L$ when the desired lower speed of the drive is approached.

Thus, by employing the retriggerable multivibrator or other suitable delay means together with the remaining circuit components discussed, a controlled stop pulse is generated which provides a reverse drive current to the armature winding for rapidly braking the tape drive and, therefore, the tape within the desired limits. In practice, it has been found that optimum braking action is achieved by selecting the lower speed limit to be one-sixth that of the normal running speed.

It will become apparent to those skilled in the art that various modifications to the specific circuitry shown in the preferred embodiment can be made without departing from the spirit or scope of the present invention as defined by the appended claims.

The embodiments of the invention in which an exclusive property or priviledge is claimed are defined as follows:

1. A tape transport including a playback head, comprising: means, including a drive motor, for transporting tape across the head; tachometer means for generating pulse-type signals continuously representative of actual tape speeds during the operation of the transporting means; a motor drive circuit means coupled to said drive motor for selectively applying first or second drive signals to said motor, said first signals causing a forward running mode of operation of the transporting means; means for providing a stop signal; and circuit means coupled to said stop-signal providing means, to said tachometer means and to said motor drive circuit means for initiating a controlled stop signal in response to said stop signal from said providing means and terminating said controlled stop signal at a particular reduced tape speed greater than zero in response to signals from said tachometer means representative of such reduced speed, and for applying said controlled stop signal to said drive circuit means; said drive circuit means being responsive to said controlled stop signal by applying said second drive signals to said drive motor, said second drive signals being of a reverse character which tends to move said motor in an opposite direction from that caused by said drive signals.

2. The tape transport as defined in claim 1 wherein said tachometer means is coupled to said tape transporting means for providing pulsing tach signals whose frequency represents the speed of tape being transported.

3. The tape transport as defined in claim 2 wherein said circuit means includes a retriggerable circuit having a presettable relaxation period for developing a controlled stop pulse in response to said stop signal and for terminating said controlled stop pulse when the period between successive cycles of tach signals exceeds said relaxation period.

4. The tape transport as defined in claim 3 wherein said retriggerable circuit comprises a retriggerable multivibrator having a relaxation period fixed at least in part by an RC network.

5. The tape transport as defined in claim 4 wherein said means for providing a stop pulse comprises means for receiving a stop command signal and supplying a stop signal in response thereto, gate means receiving said stop signal for developing a stop pulse in response thereto and for selectively applying said stop pulse to said retriggerable multivibrator to actuate said multivibrator only when a stop command signal is received.

6. The tape transport as defined in claim 5 wherein said gate means includes pulse shaping means for determining the pulse width of said stop pulse.

7. A method of reducing the braking time of tape transported by a tape transport having tape drive means including a drive motor, comprising the steps of: applying first drive signals to the drive motor to bring about forward running operation thereof; monitoring tape speed and producing pulsing signals representative thereof; and using said pulsing signals in stopping said tape by removing said first drive signals, applying second drive signals to the drive motor which are of a character to drive the motor in a reverse direction, and removing said second drive signals in response to said pulsing speed-representative signals having slowed to the point where the period between successive pulses thereof exceeds a predetermined interval, ocurring when the tape speed is reduced to a predetermined lower level.

8. In a tape transport including a transport drive motor and means for generating signals representative of the instantaneous speed of tape transported by said transport, the improvement for reducing the stopping time for the tape comprising: means for producing a stop signal in response to a predetermined stop command; means, including a triggerable circuit having a particular duty cycle, coupled to said producing means and to the generating means, for developing a controlled stopping signal by triggering of said triggerable circuit, said controlled stopping signal initiated by said stop signal and terminating when the signals from said generating means have a value representative of tape speed having decreased to a predetermined value greater than zero; and a motor drive circuit coupled to said developing means and to the drive motor and responsive to said controlled stopping signal to apply a reversing drive signal to said motor tending to drive the motor in a reverse direction, thereby rapidly slowing the speed of said motor to said predetermined value greater than zero.

9. The improvement as defined in claim 8 and further including pulse shaping means coupled between said producing means and said developing means to apply a stop pulse of predetermined duration to said developing means in response to a stop signal received from said producing means.

10. The improvement as defined in claim 9 wherein the generating means develops signals whose frequency is related to the speed of tape being transported.

11. The improvement as defined in claim 10 wherein said developing means includes a retriggerable circuit having a predetermined relaxation period, said retriggerable circuit coupled to said pulse shaping means and to the generating means for initiating said controlled stopping signals upon the receipt of said stop pulse and terminating said controlled stopping signals when the period between successive cycles of signals from the generating means exceeds said relaxation period.

12. The improvement as defined in claim 11 wherein said retriggerable circuit comprises a retriggerable multivibrator having a relaxation period fixed at least in part by an RC network.

13. The improvement as defined in claim 12 wherein said pulse shaping means includes a gate circuit means coupled to said retriggerable multivibrator for inhibiting the actuation of said retriggerable multivibrator until a stop signal is received by said pulse shaping means.

14. In a tape transport having: means, including a drive motor, for transporting tape across a recording or playback head, the improved braking system comprising: motor drive circuit means coupled to said drive motor for normally applying forward drive excitation to said motor to implement a running mode of operation of the transport; and means coupled to said motor drive circuit means for selectively controlling the latter to apply reverse drive excitation to said drive motor during forward movement thereof to effect braking of such movement, said reverse drive excitation being of an opposing character with respect to said normal excitation and tending to drive said motor in an opposite direction from said normal forward movement thereof, to rapidly slow such forward movement; said means coupled to said motor drive circuit selectively controlling the latter to remove said reverse drive excitation at a time subsequent to that at which the same was applied, and controlling said motor drive circuit to remove both forward and reverse drive excitation from said drive motor at said subsequent time, said time subsequent occurring when said forward movement has been slowed to about one sixth its normal level, said means including means for determining the occurrence thereof.

* * * * *

UNITED STATES PATENT OFFICE
CERTIFICATE OF CORRECTION

PATENT NO. : 3,895,277

DATED : July 15, 1975

INVENTOR(S) : Marlin K. Klumpp

It is certified that error appears in the above-identified patent and that said Letters Patent are hereby corrected as shown below:

Column 6, line 45,
After "said" insert ---first---.

Signed and Sealed this

*second* Day of *December 1975*

[SEAL]

*Attest:*

RUTH C. MASON
*Attesting Officer*

C. MARSHALL DANN
*Commissioner of Patents and Trademarks*